(12) United States Patent
Kim et al.

(10) Patent No.: US 8,903,609 B2
(45) Date of Patent: Dec. 2, 2014

(54) HYBRID MOTOR DRIVEN POWER STEERING SYSTEM FOR COMMERCIAL VEHICLE AND METHOD OF IMPROVING PERFORMANCE AND FUEL EFFICIENCY THROUGH CONTROL THEREOF

(71) Applicant: Hyundai Motor Company, Seoul (KR)

(72) Inventors: Jongmin Kim, Hwaseong-si (KR); Soobo Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 81 days.

(21) Appl. No.: 13/685,326

(22) Filed: Nov. 26, 2012

(65) Prior Publication Data

US 2014/0012470 A1 Jan. 9, 2014

(30) Foreign Application Priority Data

Jul. 5, 2012 (KR) .................. 10-2012-0073351

(51) Int. Cl.
| | | |
|---|---|---|
| *B62D 6/00* | (2006.01) | |
| *B62D 11/00* | (2006.01) | |
| *B62D 12/00* | (2006.01) | |
| *B62D 6/08* | (2006.01) | |
| *B62D 5/04* | (2006.01) | |
| *B62D 5/065* | (2006.01) | |
| *B62D 5/06* | (2006.01) | |

(52) U.S. Cl.
CPC .. *B62D 6/00* (2013.01); *B62D 6/08* (2013.01); *B62D 5/04* (2013.01); *B62D 5/065* (2013.01); *B62D 5/0463* (2013.01); *B62D 5/06* (2013.01); *B62D 5/0409* (2013.01)
USPC ............... 701/42; 701/41; 180/422; 180/444

(58) Field of Classification Search
CPC ............... B62D 6/08; B62D 5/06; B62D 6/00
USPC .......................... 701/42, 41; 180/422, 444
See application file for complete search history.

(56) References Cited

U.S. PATENT DOCUMENTS 3,011,579 A * 12/1961 Milliken, Jr. et al. .......... 180/422
3,437,187 A * 4/1969 Ikemoto et al. ........... 192/48.611

(Continued)

FOREIGN PATENT DOCUMENTS

| JP | 4-212672 A | 8/1992 |
|---|---|---|
| JP | 9-216566 A | 8/1997 |

(Continued)

*Primary Examiner* — Mary Cheung
*Assistant Examiner* — Frederick Brushaber
(74) *Attorney, Agent, or Firm* — Morgan, Lewis & Bockius LLP

(57) ABSTRACT

A hybrid motor driven power steering system for a commercial vehicle may include a MDPS unit to generate motor output torque depending on driver steering torque, an EHPS unit to generate hydraulic output torque considering the motor output torque of the MDPS unit, a ball nut type gear box to generate output torque which operates a tie rod leading to left and right wheels after being input with the driver steering torque, the motor output torque, and the hydraulic output torque, and two torsion bars to block torque fluctuation rates at respective regions of a joint by detecting a road surface reaction force transferred to a steering column through the ball nut type gear box in at least two different positions. Accordingly, it may be possible to provide a steering capacity required in small-sized, medium-sized and full-sized commercial vehicles.

18 Claims, 7 Drawing Sheets

(56) References Cited

U.S. PATENT DOCUMENTS

| | | | | |
|---|---|---|---|---|
| 4,406,341 | A | * | 9/1983 | Bertin .......................... 180/428 |
| 4,979,115 | A | * | 12/1990 | Takahashi .................... 701/41 |
| 4,979,116 | A | * | 12/1990 | Takahashi .................... 701/41 |
| 6,909,951 | B2 | * | 6/2005 | Llewellyn et al. ............ 701/43 |
| 7,028,545 | B2 | * | 4/2006 | Gandel et al. ................. 73/328 |
| 7,659,685 | B2 | * | 2/2010 | Cesario et al. ............... 318/712 |
| 2013/0277136 | A1 | * | 10/2013 | Young .......................... 180/422 |

FOREIGN PATENT DOCUMENTS

| | | |
|---|---|---|
| JP | 2005-96729 A | 4/2005 |
| JP | 2010-264903 A | 11/2010 |
| JP | 2012-46095 A | 3/2012 |
| KR | 10-2010-0063290 A | 6/2010 |
| KR | 10-2010-0094641 A | 8/2010 |
| KR | 10-2011-0104654 | 9/2011 |

\* cited by examiner

HYBRID MOTOR DRIVEN POWER STEERING SYSTEM FOR COMMERCIAL VEHICLE AND METHOD OF IMPROVING PERFORMANCE AND FUEL EFFICIENCY THROUGH CONTROL THEREOF

CROSS-REFERENCES TO RELATED APPLICATIONS

The present application claims priority of Korean Patent Application Number 10-2012-0073351, filed on Jul. 5, 2012, the entire contents of which application is incorporated herein for all purposes by this reference.

BACKGROUND OF INVENTION

1. Field of Invention

The present invention relates to a steering system for a commercial vehicle; and, particularly, to a hybrid motor driven power steering system for a commercial vehicle, and a method of improving performance and fuel efficiency through control thereof. The steering system is capable of greatly increasing fuel efficiency as well as satisfying a steering capacity of about 50 KN to 190 KN required in small-sized, medium-sized, and full-sized commercial vehicles by constructing a ball nut type gear box together with a Motor Driven Power Steering (MDPS) unit and an Electro-Hydraulic Power Steering (EHPS) unit controlled by a main steering control device, and capable of significantly improving the driver's steering operability by constructing two torsion bars for the respective MDPS unit and EHPS unit.

2. Description of Related Art

A steering device generally needs a hydraulic pump because of using hydraulic pressure as a steering assist force. The hydraulic pump is driven by an engine, thereby causing loss of an engine driving force. This loss of the engine driving force results in deterioration of fuel efficiency. Accordingly, if the loss of the engine driving force is reduced through the steering device, the fuel efficiency may be improved correspondingly to the reduced loss.

As an example of improvement in fuel efficiency, there is a hydraulic steering device, though having the hydraulic pump driven by the engine, capable of reducing the loss of the engine driving force by decreasing resistance in a hose or a flow rate of the pump during idling of the engine. The improvement in fuel efficiency using the hydraulic steering device, however, is not effective due to the hydraulic pump driven by the engine. To overcome this problem, the hydraulic pump should not be driven by the engine.

As a steering device from which the hydraulic pump is not driven by the engine, there may be a Motor Driven Power Steering (MDPS) device which uses an electric motor or an Electro-Hydraulic Power Steering (EHPS) device which uses an electric pump driven by a motor instead of an engine driving force. Therefore, the MDPS or EHPS device is used as a steering device of a hybrid passenger vehicle which absolutely needs improvement in fuel efficiency.

In addition to the passenger vehicle, the fuel efficiency improvement should be achieved also in a commercial vehicle. Thus, if the MDPS or EHPS device is used as the steering device for the commercial vehicle without the hydraulic pump using the engine driving force, the fuel efficiency of the commercial vehicle may be significantly increased.

The MDPS or EHPS device, however, has a limit in steering capacity. That is, the MDPS or EHPS device may be suitable for the passenger vehicle which needs the steering capacity of about 13 KN, but may not be suitable for the medium-sized or full-sized commercial vehicle which needs the steering capacity of about 50 KN to 190 KN. For this reason, in the case of solely applying the MDPS or EHPS device to the commercial device to increase the fuel efficiency, scarcity of the steering capacity must be solved first.

The MDPS and EHPS devices together with a rack and pinion type gear box may be used as the steering devices adapted for increasing the steering capacity of the commercial vehicle. But difficulty remains in using the devices for the medium-sized or full-sized commercial vehicle which needs the steering capacity of about 50 KN to 190 KN. Meanwhile, when the MDPS and EHPS devices are used as the steering devices, a phenomenon is generated in which twisting felt by a driver differs from real twisting of a steering column. Consequently, this phenomenon must be solved.

To this end, one torsion bar is applied to the steering devices and is installed to a region of the gear box to reflect a road surface reaction force transferred to the gear box, but the reflection may not be effective. The basic reason is because of the layout of the MDPS and EHPS devices. For example, in the layout of the steering device, each of the region of the steering column to which the MDPS device is mounted, the region of the steering column to which the EHPS device is mounted, and the region of the joint (universal joint) to connect the steering column have different stiffness, and difference in stiffness between the regions generates a torque fluctuation rate at the region of the joint (universal joint). Thus, the twisting felt by a driver may differ from the real twisting of the steering column.

The MDPS and EHPS devices may be controlled in a state of exactly reflecting the road surface reaction force due to difference in twisting as described above, thereby causing performance deterioration of the steering device. Therefore, in order to apply the MDPS and EHPS devices, which may help in improving fuel efficiency, to the commercial vehicle requiring high steering capacity of about 50 KN to 190 KN, it is necessary to solve the phenomenon in which the twisting felt by a driver differs from the real twisting of the steering column.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

One aspect of the present invention is directed to provide a hybrid motor driven power steering system for a commercial vehicle, and a method for improving performance through control thereof capable of providing a high steering capacity of about 50 KN to 190 KN required in small-sized, medium-sized, and full-sized commercial vehicles by constructing a ball nut type gear box together with a Motor Driven Power Steering (MDPS) unit and an Electro-Hydraulic Power Steering (EHPS) unit controlled by a main steering control device, thereby being capable of greatly increasing performance and fuel efficiency.

Another aspect of the present invention is directed to provide a hybrid motor driven power steering system for a commercial vehicle, and a method of improving fuel efficiency through control thereof capable of installing a first torsion bar to a gear box to which an EHPS unit is closed and installing a second torsion bar to a steering column to which a MDPS unit is mounted, thereby preventing a torque fluctuation rate from being generated at a joint (universal joint) region of the steering column to connect a MDPS mounting portion and an EHPS mounting portion, which have different stiffness, through proper control, and particularly, greatly increasing performance of the steering system by steering control in which a road surface reaction force is exactly reflected.

Another aspect of the present invention is directed to a method of improving performance and fuel efficiency through control of a hybrid motor driven power steering system for a commercial vehicle capable of corresponding also to the requirement of, particularly, a full-sized commercial vehicle, by constructing a MDPS unit and an EHPS unit to be used as a main steering control system and realizing catch-up performance using an auxiliary EHPS unit which is additionally mounted, separately from the construction.

Various aspect of the present invention provide a hybrid motor driven power steering system for a commercial vehicle that may include a MDPS unit configured to generate motor output torque corresponding to a portion of detected driver torque, wherein the MDPS unit is mounted to a steering column connecting a steering wheel, an EHPS unit configured to generate hydraulic output torque, to create, together with the motor output torque of the MDPS unit, an output required for steering the commercial vehicle, a ball nut type gear box configured to include a hydraulic cylinder having a large hydraulic area and a ball nut to generate real output torque of a piston using hydraulic pressure supplied from the EHPS unit, a link configured to be operated by the output torque generated at the ball nut type gear box to operate a tie rod connected to left and right wheels, and two torsion bars configured to be respectively installed in at least two different positions of the steering column to detect a road surface reaction force which is introduced to the ball nut type gear box and transferred to the steering wheel.

The MDPS unit may include a motor controlled by a controller to generate the motor output torque, a decelerator which decreases a rotational force of the motor and increases torque of the motor, and a torque sensor which detects steering angle information of the steering wheel by the driver torque and transfers the detected steering angle information to the controller.

The EHPS unit may include a pump controlled by a controller to generate the hydraulic output torque, and an oil reservoir which stores oil to provide hydraulic pressure sent to the hydraulic cylinder from the pump.

The link may include a pitman arm which is connected to the ball nut of the ball nut type gear box and converts a rotation of the ball nut to an angular motion, a drag link which is connected to the pitman arm and is pulled or pushed, and a spindle arm to transfer movement of the drag link to any one of the left and right wheels.

One of the two torsion bars may be used as an EHPS torsion bar which is installed at one portion of the steering column mounting the EHPS unit, whereas the other may be used as a MDPS torsion bar which is installed at the other portion of the steering column mounting the MDPS unit.

The EHPS unit may be connected to a hydraulic line to supply the hydraulic cylinder with a hydraulic pressure, the hydraulic line may be formed with another hydraulic line branched at a position before the hydraulic cylinder, a conversion valve may be installed between the hydraulic line and the branched hydraulic line, and an auxiliary EHPS unit may be installed at the branched hydraulic line.

The MDPS unit and the EHPS unit may collectively have a steering capacity of 50 KN to 100 KN, and may be adapted for small-sized and medium-sized commercial vehicles.

Various aspects of the present invention provide a hybrid motor driven power steering system for a commercial vehicle that may include a MDPS unit configured to generate motor output torque corresponding to a portion of detected driver torque, wherein the MDPS unit is mounted to a steering column connecting a steering wheel, an EHPS unit configured to generate hydraulic output torque, to create, together with the motor output torque of the MDPS unit, an output required for steering the commercial vehicle, wherein the EHPS unit is connected to a hydraulic line to supply a hydraulic pressure to a hydraulic cylinder, an auxiliary EHPS unit installed at a branched hydraulic line, wherein the branched hydraulic line is split from the hydraulic line at a position before the hydraulic cylinder, a conversion valve is installed between the hydraulic line and the branched hydraulic line, and the auxiliary EHPS unit supplies another hydraulic pressure to the hydraulic cylinder through the branched hydraulic line when the conversion valve is open, a ball nut type gear box configured to include the hydraulic cylinder having a large hydraulic area and a ball nut to generate real output torque of a piston using hydraulic pressures supplied by the EHPS unit and the auxiliary EHPS unit, a link configured to be operated by the output torque generated at the ball nut type gear box to operate a tie rod connected to left and right wheels, and two torsion bars configured to be respectively installed in at least two different positions of the steering column to detect a road surface reaction force which is introduced to the ball nut type gear box and transferred to the steering wheel.

The auxiliary EHPS unit may operate when the hydraulic output torque provided by the EHPS unit is insufficient.

The EHPS unit may operate when the hybrid motor driven power steering system satisfies a relation of "maximum flow rate of pump of the EHPS unit×0.9<flow rate required in pump of the EHPS unit" and a relation of "drive steering torque>steering angular speed absolute value". The steering angular speed absolute value may be about 450 degrees/s.

The MDPS unit, the EHPS unit, and the auxiliary EHPS unit may collectively have a steering capacity of 100 KN to 190 KN, and may be adapted for steering a full-sized vehicle.

Various aspects of the present invention provides a method for improving performance and fuel efficiency through control of a hybrid motor driven power steering system for a commercial vehicle. The method may include providing information which includes a steering angle signal, a steering torque signal, a vehicle speed, or a yaw rate of the vehicle, computing a motor output torque value, which is a portion of a driver torque, for a MDPS unit, computing a hydraulic output torque value, which is the remaining portion of the driver torque, for a EHPS unit, performing a reversal input robust control manner which, depending on the vehicle speed, secures reversal input robust by steering the EHPS unit near wheels during a high speed driving with difficulty, and secures basic steering power by steering the MDPS unit near a driver with ease, performing a steering performance enhancing control manner which, depending on the vehicle speed, enhances vehicle reactivity with respect to a steering operation by steering the EHPS unit with ease during a low speed driving, and generating the motor output torque of the MDPS unit and the hydraulic output torque of the EHPS unit after the reversal input robust control manner and the steering performance enhancing control manner are performed, and providing the motor output torque and the hydraulic output torque as an output torque of a ball nut type gear box so that the motor output torque and the hydraulic output torque operate a link connected to a tie rod to operate left and right wheels.

When the reversal input robust control manner is performed, the MDPS unit may be realized by "[MDPS tuning map×M (control amount)×[torque change×vehicle speed× yaw rate change]/(steering angle change)]+K (control ratio distribution amount)", the EHPS unit may be realized by "[MDPS tuning map×M (control amount)×(steering angle change)/[torque change×vehicle speed×yaw rate change]]+L (control ratio distribution amount)", and the K (control ratio distribution amount) and the L (control ratio distribution amount) may be respectively proportional to a detection value of a MDPS torsion bar of the MDPS unit according to the driver torque and a detection value of an EHPS torsion bar of the EHPS unit according to the driver torque.

When the steering performance enhancing control manner is performed, the MDPS unit may be realized by "[MDPS tuning map×N (control amount)×(vehicle speed/steering angle)]+K (control ratio distribution amount)" to steer a steering wheel with difficulty during the low speed driving, and may be realized by "[MDPS performance enhancing map×N (control amount)×(vehicle speed/steering angle)]" to increase a torque control amount for enhancing the performance during the low speed driving, whereas the EHPS unit may be realized by "[EHPS tuning map×N (control amount)× (vehicle speed/steering angle)]+L (control ratio distribution amount)" to steer the steering wheel with ease during the high speed driving.

The method of improving performance and fuel efficiency through control of a hybrid electronic power steering system for a commercial vehicle may further include executing a catch-up performance enhancing logic, when a fuel efficiency improving logic is performed, to further generate separate hydraulic output torque from the EHPS unit by continuously checking the hydraulic output torque provided from the EHPS unit and operating a separate auxiliary EHPS unit when the hydraulic output torque provided from the EHPS unit is insufficient.

The catch-up performance enhancing logic may be executed by preparing the catch-up performance enhancing logic in which it is determined that ignition of an engine is ON by a revolution speed of the engine, without generation of error or warning items needing blinking of a warning light when a ignition key is turned ON, and after the fuel efficiency improving logic is performed, a pump capacity of the EHPS unit is continuously checked, and performing the catch-up performance enhancing logic in which when it is determined that the pump capacity of the EHPS unit is insufficient, a current steering angular speed value detected by the driver torque is larger than a set steering angular speed absolute value, and the current steering angular speed value is large, the auxiliary EHPS unit is operated.

In the performing the catch-up performance enhancing logic, the insufficient status of the pump capacity of the EHPS unit is determined by "maximum flow rate of pump of the EHPS unit×0.9<flow rate required in pump of the EHPS unit", and the steering angular speed absolute value is about 450 degrees/s.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The drawings are not necessarily to scale and in some instances, proportions may have been exaggerated in order to clearly illustrate features of the embodiments. When a first layer is referred to as being "on" a second layer or "on" a substrate, it not only refers to a case where the first layer is formed directly on the second layer or the substrate but also a case where a third layer exists between the first layer and the second layer or the substrate.

Figure 1:
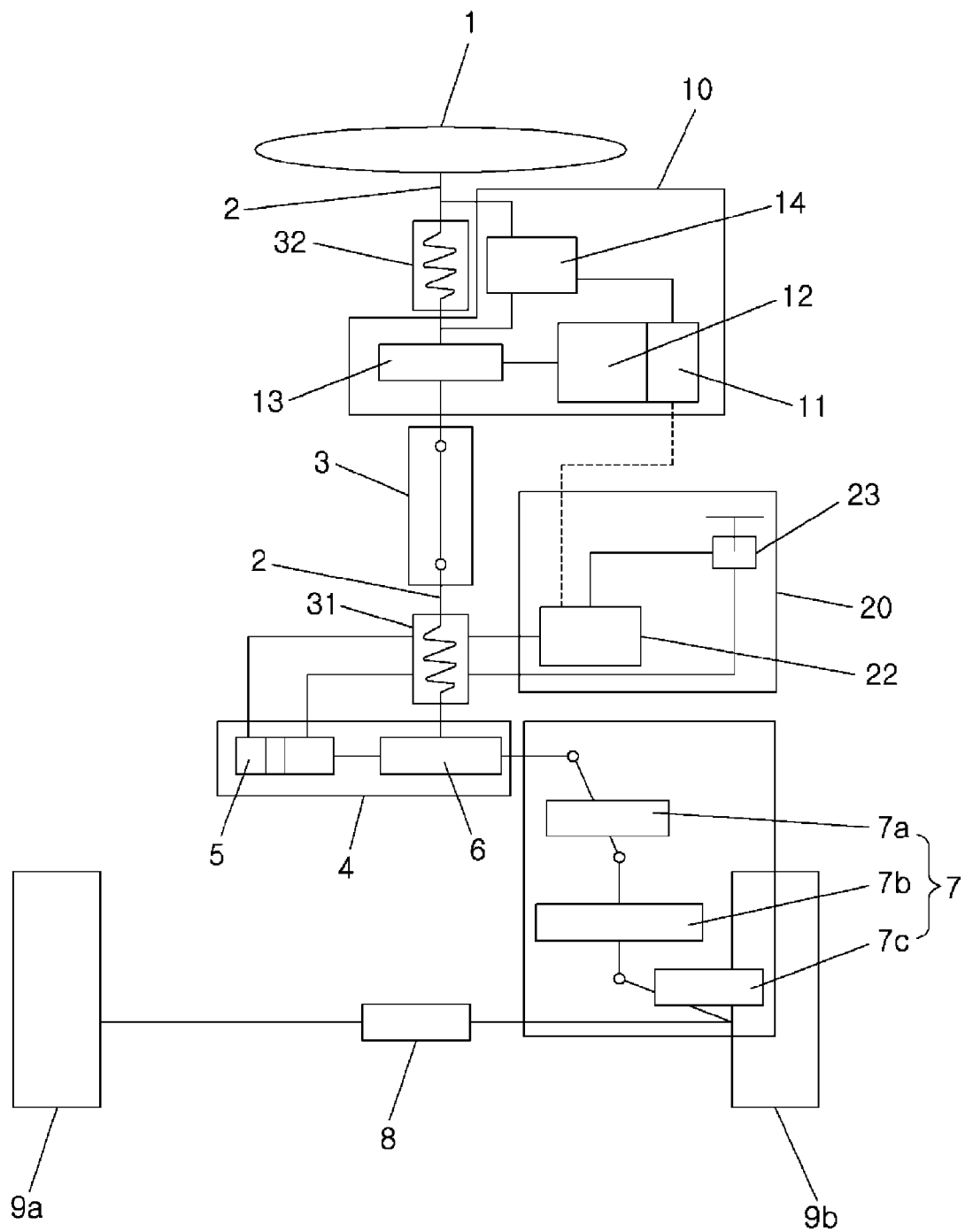
FIG. 1 is a diagram illustrating a configuration of an exemplary hybrid motor driven power steering system for a commercial vehicle in accordance with the present invention.

FIG. 1 shows a configuration of an exemplary hybrid motor driven power steering system for a commercial vehicle in accordance with various embodiments of the present invention. As shown in FIG. 1, in various embodiments, the hybrid motor driven power steering system for a commercial vehicle includes a steering column 2 which is connected with a steering wheel 1 and has regions coupled by a joint 3, a ball nut type gear box 4 which is connected with a link 7 to operate a tie rod 8 leading to or connected with left and right wheels 9a and 9b, a Motor Driven Power Steering (MDPS) unit 10 to generate a steering force by an electric motor, an Electro-Hydraulic Power Steering (EHPS) unit 20 to generate the steering force by an electric pump, and a pair of torsion bars 31 and 32 which is respectively installed at different positions of the steering column 2 so as to provide information for cancelling out or compensating torque fluctuation rates generated at the regions of the joint 3. The joint 3 is typically made of a universal joint.

The ball nut type gear box 4 includes a hydraulic cylinder 5 which is provided with a piston having a large hydraulic area and generating hydraulic output torque by the EHPS unit 20, and a ball nut 6 which is input with the hydraulic output torque transferred from the hydraulic cylinder 5 in addition to a motor output torque input from the MDPS unit 10.

Generally, the hydraulic output torque is input to the ball nut 6 using a rod of the hydraulic cylinder 5 provided with the piston having the large hydraulic area, and the motor output torque is input to the ball nut 6 through a pinion provided at the steering column 2.

In the ball nut 6, the rod of the hydraulic cylinder 5 is changed from rectilinear motion to rotational motion during the input of the torque through the rod, whereas the pinion is maintained as rotational motion without diversion during the input of the torque through the pinion. Therefore, the output torque from the ball nut type gear box 4 is a rotational force of the ball nut 6, and this ball nut type gear box 4 is typically referred to as a ball nut type gear box.

The link 7 includes a pitman arm 7a to change the output torque of the ball nut type gear box 4 to angular motion, a drag link 7b which is connected to the pitman arm 7a and is pulled or pushed, and a spindle arm 7c to transfer movement of the drag link 7b to the right wheel 9b of the left and right wheels 9a and 9b.

In general, the pitman arm 7a is connected to a shaft of the ball nut 6 in the gear box 4, thereby changing or converting the rotation of the ball nut 6 to the angular motion. The pitman arm 7a is angularly moved in a clockwise or counterclockwise direction depending on a rotational direction of the shaft of the ball nut 6, such that a vehicle may be turned to the left or the right. The left wheel 9a follows a steering angle of the right wheel 9b through the tie rod 8. The above-mentioned link 7 is a configuration element of the steering system applied to the typical commercial vehicle.

The MDPS unit 10 includes a motor 12 driven by the control of a controller 11 recognizing the driver's steering intention, a decelerator 13 which decreases a rotational force of and increases torque of the motor 12 to transfer the decreased rotational force and increased torque to the steering column 2, and a torque sensor 14 which detects a steering angle of the steering wheel 1 to transfer the detected steering angle to the controller 11. The controller 11 may be an exclusive controller to control only the MDPS unit 10, or a controller to which an Electronic Control Unit (ECU) is applied. The motor 12 is an electric motor type.

The decelerator 13 further includes a worm shaft connected to the motor 12 and a worm wheel connected to the steering column 2.

The motor output torque generated through the MDPS unit 10 is input to the ball nut 6 through the rotation of the pinion provided at the steering column 2, and the ball nut 6 is rotated in the same rotational direction as the pinion to allow the output torque to be generated at the gear box 4.

The EHPS unit 20 includes a pump 22 driven by the control of the controller recognizing the driver's steering intention, and an oil reservoir 23 to store oil supplied to the hydraulic cylinder 5 of the gear box 4 by pumping of the pump 22.

The controller may be an exclusive controller to control only the EHPS unit 20, but is the same as the controller 11 of the MDPS unit 10 in the present exemplary embodiment. The pump 22 is a motor pump type.

The hydraulic output torque generated through the EHPS unit 20 is input to the ball nut 6 in the form of the rectilinear motion through the rod of the hydraulic cylinder 5 provided with the piston having the large hydraulic area, and the ball nut 6 changes the rectilinear motion of the rod to the rotational motion to allow the output torque to be generated at the ball nut type gear box 4.

In the ball nut 6, the direction of the rectilinear motion of the rod coincides with the rotational direction of the pinion. Consequently, the output torque of the ball nut type gear box 4 becomes torque which adds the motor output torque of the MDPS unit 10 to the hydraulic output torque of the EHPS unit 20.

Therefore, the steering system of the present exemplary embodiment has an increased steering capacity which adds the steering capacity by the motor output torque of the MDPS unit 10 to the steering capacity by the hydraulic output torque of the EHPS unit 20. Accordingly, the steering system may satisfy the steering capacity of about 50 KN to 190 KN required in the commercial vehicle.

Meanwhile, a pair of torsion bars is installed at the steering column 2. One is used as an EHPS torsion bar 31 and is installed at the steering column 2 mounting the MDPS unit 10 or at one portion of the steering column 2 where the EHPS unit 20 is mounted, whereas the other is used as a MDPS torsion bar 32 and is installed at the steering column 2 mounting the MDPS unit 10 or at other portion of the steering column 2 where the MDPS unit 10 is mounted. Generally, the steering column 2 mounting the MDPS unit 10 is mounted is connected to the steering column 2 mounting the EHPS unit 20 by the joint 3.

By constructing the EHPS torsion bar 31 and the MDPS torsion bar 32 as described above, the torque fluctuation due to difference in stiffness may be prevented from being generated at the respective regions in which the steering column 2 mounting the MDPS unit 10 and the steering column 2 mounting the EHPS unit 20 are connected to each other by the joint 3.

Figure 2:
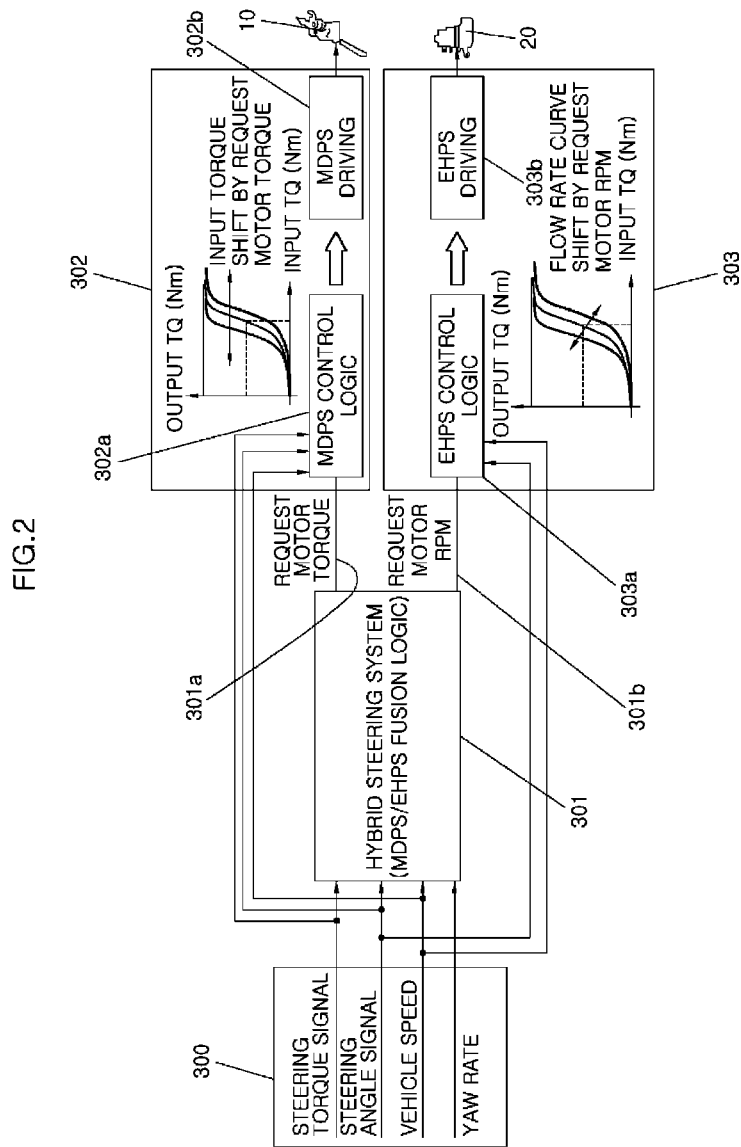
FIG. 2 is a block diagram illustrating performance and fuel efficiency improving logic which is applied to an exemplary hybrid motor driven power steering system for a commercial vehicle in accordance with the present invention.

FIG. 2 is a block diagram illustrating performance and fuel efficiency improving logic which is applied to an exemplary hybrid motor driven power steering system for a commercial vehicle in accordance with various embodiments of the present invention. As shown in FIG. 2, in various embodiments, the performance and fuel efficiency improving logic includes an information provision block 300 to detect information depending on an operation of the hybrid motor driven power steering system for a commercial vehicle together with information depending on driving of the vehicle, a hybrid determination block 301 to calculate a required steering force using various information input from the information provision block 300 and then compute respective request control values for the motor output torque of the MDPS unit 10 and the hydraulic output torque of the EHPS unit 20, a MDPS control block 302 to compute a new motor output value of the MDPS unit 10 using one of the request control values input from the hybrid determination block 301, and an EHPS control block 303 to compute a new pump output value of the EHPS unit 20 using the other of the request control values input from the hybrid determination block 301.

The information provision block 300 includes a steering angle signal and a steering torque signal together with a vehicle speed and a yaw rate of the vehicle. The request control values of the hybrid determination block 301 are classified into a request motor torque output value 301a provided at the MDPS unit 10 and a request motor rpm (revolutions per minute) output value 301b provided at the EHPS unit 20.

The MDPS control block 302 includes a MDPS control logic portion 302a provided with logic to compute a new motor output value of the MDPS unit 10, and a MDPS driving portion 302b to output the new motor output value to the motor 12 of the MDPS unit 10 and to control the motor 12.

The EHPS control block 303 includes an EHPS control logic portion 303a provided with logic to compute a new pump output value of the EHPS unit 20, and an EHPS driving portion 303b to output the new pump output value to the pump 22 of the EHPS unit 20 and to control the pump 22.

In the present exemplary embodiment, the logic realized by the hybrid determination block 301 and the MDPS control block 302 processes the vehicle speed and the yaw rate of the vehicle, the steering angle signal, and the steering torque signal which are provided from the information provision block 300, thereby resulting in control logic for the MDPS unit 10 which controls the motor 12 so that the output torque of the motor 12 is changed.

In addition, the logic realized by the hybrid determination block 301 and the EHPS control block 303 processes the vehicle speed and the yaw rate of the vehicle, the steering angle signal, and the steering torque signal which are provided from the information provision block 300, thereby resulting in control logic for the EHPS unit 20 which controls the pump 22 so that the output torque of the pump 22 is changed.

However, compared to the control logic for the MDPS unit 10 and the control logic for the EHPS unit 20, the other logic has a difference in that it further includes logic in which the request control values, computed by processing the vehicle speed and the yaw rate of the vehicle, the steering angle signal, and the steering torque signal, are classified into the MDPS unit 10 and the EHPS unit 20. Consequently, the request control values are provided at the MDPS unit 10 and the EHPS unit 20 as the request motor torque and the request motor rpm, respectively.

The logic realized by the hybrid determination block 301, the MDPS control block 302, and the EHPS control block 303 are defined as the performance and fuel efficiency improving logic.

Therefore, when the performance and fuel efficiency improving logic is performed, the motor output torque value taken charge of by the MDPS unit 10 and the hydraulic output torque value taken charge of by the EHPS unit 20 are first computed from the information which includes the vehicle speed and the yaw rate of the vehicle, the steering angle signal, and the steering torque signal.

In this case, the total sum of the motor output torque value taken charge of by the MDPS unit 10 and the hydraulic output torque value taken charge of by the EHPS unit 20 is equal to driver torque required for a driver.

Next, on the basis of a driving speed of the vehicle, a reversal input robust control manner is performed according to high speed driving, or a steering performance enhancing control manner is performed according to low speed driving.

The reversal input robust control manner secures reversal input robust by steering the EHPS unit 20 near the wheels 9a and 9b with difficulty, but secures basic steering power by steering the MDPS unit 10 near a driver with ease.

Generally, the signals required for determination of the reversal input are the vehicle speed, the steering torque, the steering angle, and the yaw rate. The reversal input is increased as the absolute value of the vehicle speed is increased and is increased as the short-term periodic change value of the steering torque is increased. Thus, it is necessary to reduce a control amount depending on driver's steering conditions when the short-term value of the steering angle is greatly changed, and the reversal input is increased when the short-term value of the yaw rate is greatly changed.

Therefore, the reversal input robust control manner is performed, the logic at the MDPS unit 10 may be realized as "[MDPS tuning map×M (control amount)×[torque change×vehicle speed×yaw rate change]/(steering angle change)]+K (control ratio distribution amount)". Accordingly, the gain may be set to be proportional to the steering torque change value and the yaw rate change value and to be inversely proportional to the steering angle change, and thus the operation of the steering wheel 1 is controlled with ease during the high speed driving.

On the other hand, the logic at the EHPS unit 20 may be realized as "[MDPS tuning map×M (control amount)×(steering angle change)/[torque change×vehicle speed×yaw rate change]]+L (control ratio distribution amount)". Accordingly, the gain may be set to be inversely proportional to the steering torque change value and the yaw rate change value and to be proportional to the steering angle change, and thus the operation of the steering wheel 1 is controlled with difficulty during the high speed driving.

In this case, the "K (control ratio distribution amount)/L (control ratio distribution amount)" is constituted to be proportional to the steering force according to the twisting of the MDPS torsion bar 32 and the twisting of the EHPS torsion bar 31. This is defined by the following relational equation.

$$K\text{(control ratio distribution amount) or } L\text{(control ratio distribution amount)} = (MDPS+EHPS \text{ tuning map} - ("1"+"2"))(MDPS \text{ tuning map or EHPS tuning map}/(MDPS \text{ tuning map}+EHPS \text{ tuning map})).$$

Where, "1"=[MDPS tuning map×M (control amount)×[torque change×vehicle speed×yaw rate change]/(steering angle change)], "2"=[MDPS tuning map×M (control amount)×(steering angle change)/[torque change×vehicle speed×yaw rate change]], and the MDPS tuning map and the EHPS tuning map respectively mean maps generally applied to the MDPS control logic and the EHPS control logic.

The steering performance enhancing control manner enhances vehicle reactivity with respect to the steering operation by steering the EHPS unit 20 with ease.

Generally, the signals required for enhancing the steering performance are the vehicle speed and the steering angle. The control amount for enhancing the steering performance is increased when the absolute value of the vehicle speed is decreased, whereas the control amount for enhancing the steering performance is decreased when the absolute value of the vehicle speed is increased. Also, the control amount for enhancing the steering performance is increased when the absolute value of the steering angle is increased, whereas the control amount for enhancing the steering performance is decreased when the absolute value of the steering angle is decreased.

Therefore, the steering performance enhancing control manner is performed, the logic at the MDPS unit 10 may be realized as "[MDPS tuning map×N (control amount)×(vehicle speed/steering angle)]+K (control ratio distribution amount)". Accordingly, the gain may be set to be proportional to the vehicle speed value and to be inversely proportional to the steering angle, and thus the operation of the steering wheel 1 is controlled with difficulty during the low speed driving.

In addition, the logic at the MDPS unit 10 may be realized as "[MDPS performance enhancing map×N (control amount)×(vehicle speed/steering angle)]". Accordingly, the gain may be set to be proportional to the vehicle speed value and to be inversely proportional to the steering angle, and thus the torque control amount is controlled to be increased for enhancing the MDPS performance during the low speed driving. Here, the MDPS tuning map and the MDPS performance enhancing map mean maps generally applied to the MDPS control logic.

On the other hand, the logic at the EHPS unit 20 may be realized as "[EHPS tuning map×N (control amount)×(vehicle speed/steering angle)]+L (control ratio distribution amount)". Accordingly, the gain may be set to be proportional to the vehicle speed value and to be inversely proportional to the steering angle, and thus the operation of the steering wheel 1 is controlled with ease during the high speed driving. Here, the EHPS tuning map means a map generally applied to the EHPS control logic.

Figure 3:
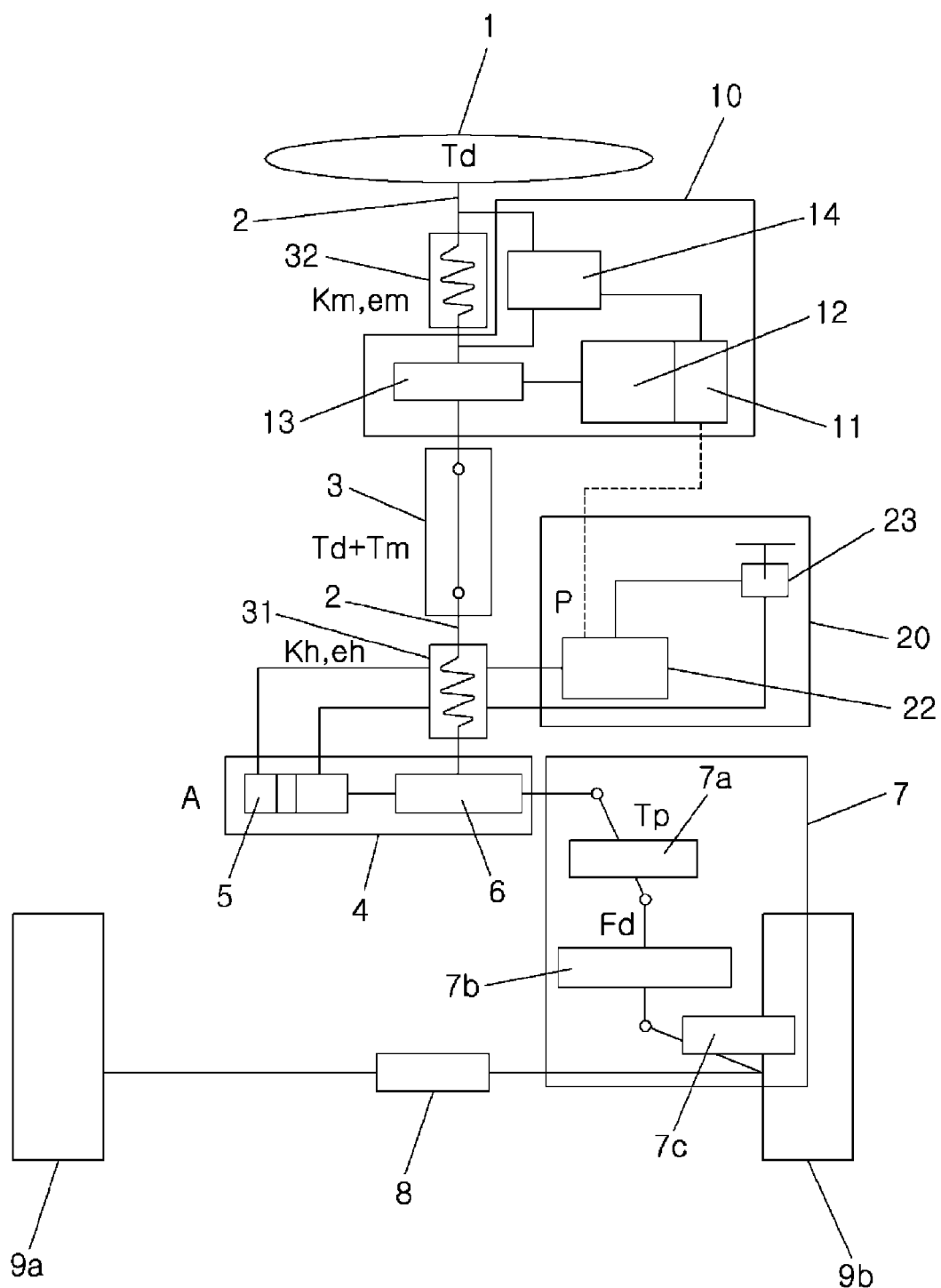
FIG. 3 is a diagram illustrating an operating state in which an exemplary hybrid motor driven power steering system for a commercial vehicle in accordance with the present invention is controlled by the performance and fuel efficiency improving logic.

Meanwhile, FIG. 3 is a diagram illustrating an operating state in which the hybrid motor driven power steering system for a commercial vehicle is controlled by the performance and fuel efficiency improving logic.

As shown in FIG. 3, the torque sensor 14 detects the torsion bar twisting generated at the MDPS torsion bar 32 by the driver torque Td to steer the steering wheel 1, and transfers the torsion bar twisting θm according to the stiffness Km of the MDPS torsion bar 32 to the controller 11. The controller 11 calculates the driver torque Td using the torsion bar twisting information θm and Km.

Next, the controller 11 computes a current suitable for the calculated driver torque Td using the tuning map, and then output the computed proper current to the motor 12. Here, the driver torque Td is computed as "Td=θm×Km", and the tuning map is a configuration element of the typical logic performed for the control of the steering system. This process is performed in the hybrid determination block 301 and the MDPS control block 302, and the output value transferred to the motor 12 means the request motor torque output value 301a.

Next, when the motor 12 is driven, the rotational force of the motor 12 is generated as the motor output torque Tm through the decelerator 13. The motor output torque Tm is transferred to the joint 3 connected to the steering column 2 mounting the MDPS unit 10, and thus the motor output torque Tm and the driver torque Td are transferred together to the joint 3. The motor output torque Tm and the driver torque Td are transferred to the steering column 2 mounting the EHPS unit 20 through the joint 3, such that the EHPS torsion bar 31 generates the twisting θh according to the stiffness Kh of the EHPS torsion bar 31 and at the same time the hydraulic pressure is supplied to the ball nut type gear box 4.

The hydraulic pressure supplied to the ball nut type gear box 4 is controlled by the controller 11 which receives the torsion bar twisting information θh and Kh of the EHPS torsion bar 31. That is, the controller 11 computes the rpm of the pump 22 suitable for the motor output torque Tm and the driver torque Td using the tuning map, and then transfers the output signal to the pump 22. Thereby, the proper hydraulic pressure is supplied to the ball nut type gear box 4. This process is performed in the hybrid determination block 301 and the EHPS control block 303, and the output value transferred to the pump 22 means the request motor rpm output value 301b.

Next, when the hydraulic pressure is transferred to the hydraulic cylinder 5 by the driving of the pump 22, the hydraulic cylinder 5 is opened and closed by the actuation of the hydraulic pressure transferred from the pump 22 to allow the cylinder rod to be moved by a moving force (pressure (P)×area (A)).

Therefore, the ball nut type gear box 4 is provided with the driver torque, the motor output torque Tm generated at the MDPS unit 10, and the moving force (pressure (P)×area (A)) of the cylinder rod generated at the EHPS unit 20 together.

Accordingly, in the ball nut type gear box 4, the motor output torque Tm of the MDPS unit 10 and the hydraulic output torque of the EHPS unit 20 are added together, thereby generating the output torque Tp of the ball nut 6. In the present exemplary embodiment, the output torque Tp has a relation of "Tp=(P×A+((Td+Tm)/ball screw lead))×sector shaft PCD)".

Next, the pitman arm 7a connected to the ball nut 6 is angularly moved due to the output torque Tp so that the drag link 7b connected to the pitman arm 7a is moved and a link steering force Fd is generated by the movement of the drag link 7b. The link steering force Fd is defined by "Fd=Tp/pitman arm length".

Next, the spindle arm 7c is moved by the link steering force Fd, and the movement of the spindle arm 7c is transferred to the tie rod 8 to operate the left wheel 9a and the right wheel 9b. Consequently, the left wheel 9a and the right wheel 9b are steered depending on the driver torque Td.

During such steering control, the steering system for a commercial vehicle according to the present exemplary embodiment senses a road surface reaction force. Thus, the torque fluctuation rates may be prevented from being generated at the respective regions in which the steering column 2 mounting the MDPS unit 10 and the steering column 2 mounting the EHPS unit 20 are connected to each other by the joint 3 due to difference in stiffness therebetween. This is because of the configuration of the EHPS torsion bar 31 and the MDPS torsion bar 32.

Figure 4:
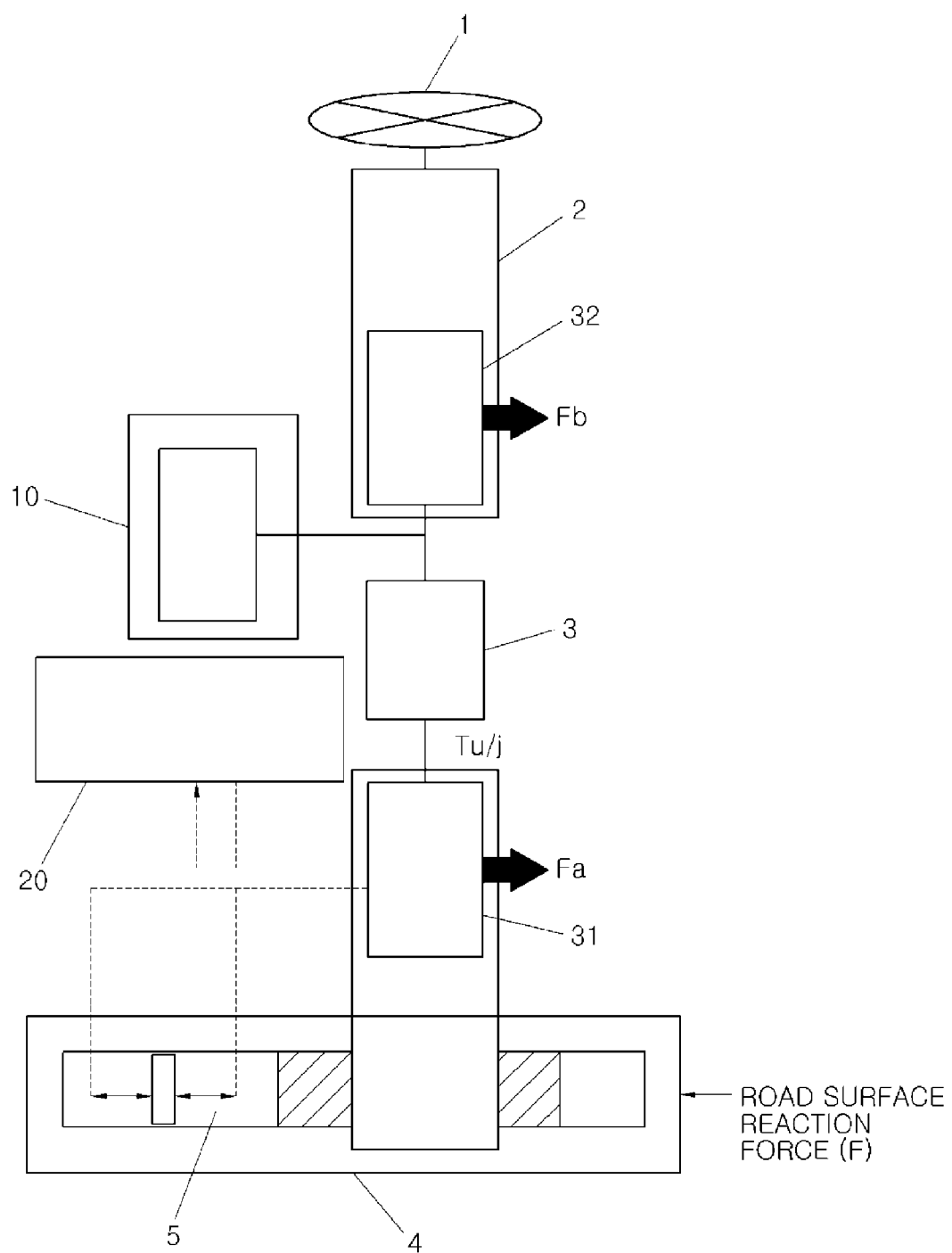
FIG. 4 is a diagram illustrating a torsion bar configuration of an exemplary hybrid motor driven power steering system for a commercial vehicle in accordance with the present invention.

FIG. 4 is a diagram illustrating an action to prevent the generation of the torque fluctuation rates of the joint 3 through the EHPS torsion bar 31 and the MDPS torsion bar 32. As shown in FIG. 4, when the road surface reaction force F is received through the ball nut type gear box 4, the road surface reaction force F is transferred to the steering column 2 mounting the EHPS unit 20 and is then detected as an EHPS road surface reaction force Fa through the EHPS torsion bar 31.

Then, the EHPS road surface reaction force Fa is transferred to the EHPS unit 20, and EHPS unit 20 generates a change in hydraulic pressure introduced into the hydraulic cylinder 5 based on the EHPS road surface reaction force Fa to allow the hydraulic output torque generated at the EHPS unit 20 to be changed.

The change in hydraulic pressure introduced into the hydraulic cylinder 5 forms an opening and closing angle of a hydraulic valve which is installed at an operation passage connecting the hydraulic cylinder 5 and the pump 22. The opening and closing angle of the hydraulic valve is controlled by the controller 11 receiving the information of the EHPS road surface reaction force Fa. Therefore, the hydraulic output torque of the EHPS unit 20 may be changed based on the road surface reaction force F.

On the other hand, the MDPS torsion bar 32 detects a MDPS road surface reaction force Fb with respect to the road surface reaction force F transferred to the steering column 2 mounting the MDPS unit 10, and the MDPS road surface reaction force Fb fills a deficient portion in the EHPS torsion bar 31 which senses the road surface reaction force F transferred to the ball nut type gear box 4. As such, the steering system of the present exemplary embodiment may exactly sense the road surface reaction force Fb transferred to the ball nut type gear box 4.

Then, the MDPS road surface reaction force Fb is transferred to the MDPS unit 10, and the controller 11 differently controls the motor 12 based on the MDPS road surface reaction force Fb, thereby changing the motor output torque generated at the MDPS unit 10. Therefore, the motor output torque of the MDPS unit 10 may be changed with reference to the road surface reaction force F.

Consequently, differences in torque as indicated in FIG. 4 by Tu/j are prevented from being generated at the respective regions in which the steering column 2 mounting the MDPS unit 10 and the steering column 2 mounting the EHPS unit 20 are connected to each other by the joint 3 due to the road surface reaction force F. Accordingly, the torque fluctuation rates, due to difference in stiffness between the steering column 2 mounting the MDPS unit 10 and the steering column 2 mounting the EHPS unit 20, are prevented from being generated at the respective regions because the steering column 2 mounting the MDPS unit 10 and the steering column 2 mounting the EHPS unit 20 are connected to each other by the joint 3. Therefore, the steering system of the present exemplary embodiment may greatly enhance the steering control performance because no difference between twisting felt by a driver through the steering wheel 1 and real twisting of the steering column 2 is generated.

Figure 5:
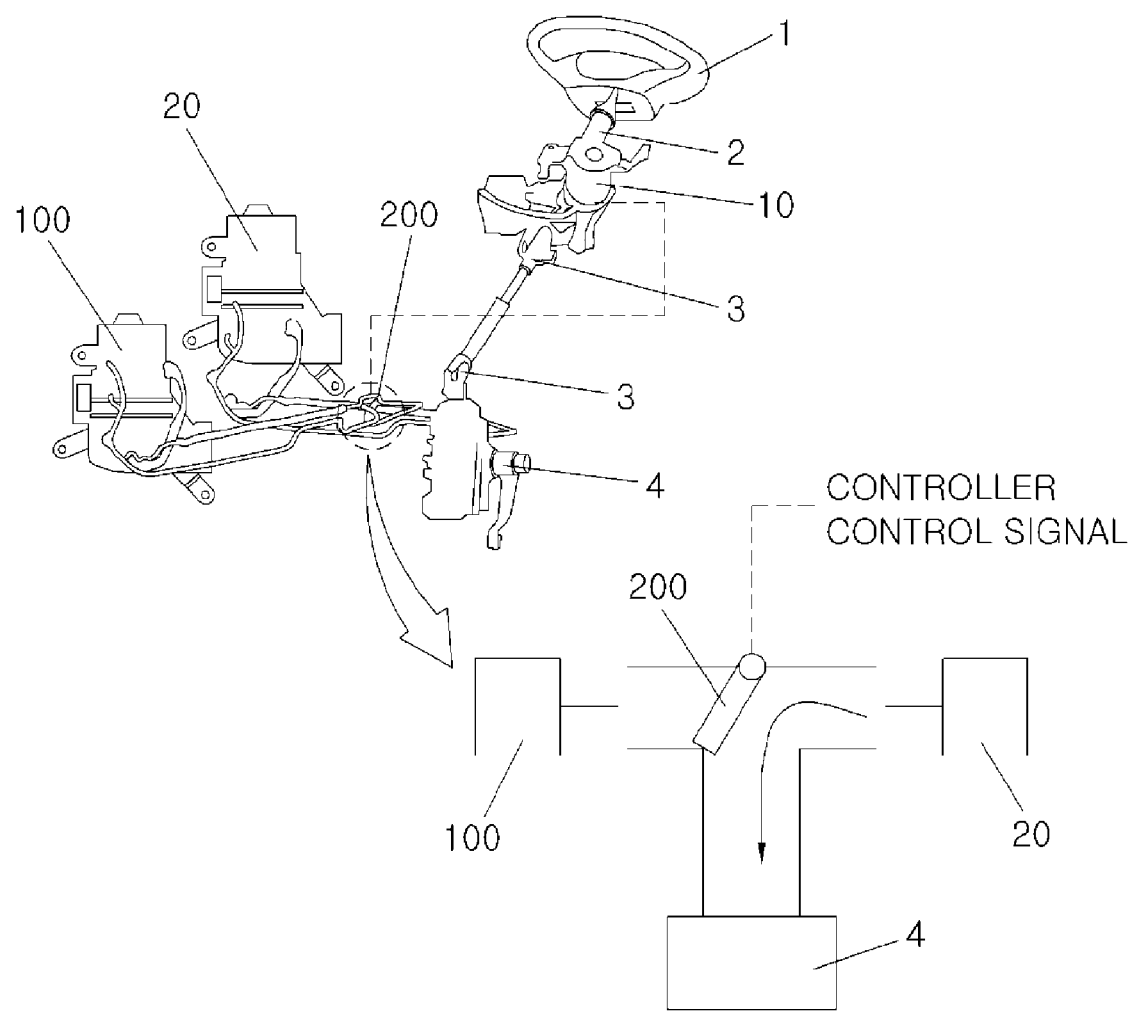
FIG. 5 is a modified example for enhancing catch-up performance of an exemplary hybrid motor driven power steering system for a commercial vehicle in accordance with the present invention.

Meanwhile, FIG. 5 shows a modified example for enhancing catch-up performance of the hybrid motor driven power steering system for a commercial vehicle. As shown in FIG. 5, a catch-up type steering system includes a steering column 2 which is connected with a steering wheel 1 and has regions coupled by a joint 3, a ball nut type gear box 4 which is connected with a link 7 to operate a tie rod 8 leading to left and right wheels 9a and 9b, a MDPS unit 10 to generate a steering force by an electric motor, an EHPS unit 20 to generate the steering force by an electric pump, and a pair of torsion bars which is respectively installed at different positions of the steering column 2 so as to provide information for cancelling out torque fluctuation rates generated at the regions of the joint 3. Also, the catch-up type steering system includes various main components similar to or substantially the same as those of the above-mentioned steering system shown in FIG. 1.

In addition, the catch-up type steering system further includes an auxiliary EHPS unit 100, and may greatly enhance catch-up performance by driving the auxiliary EHPS unit 100 together when a capacity of the EHPS unit 20 is insufficient.

For this reason, the catch-up type steering system further includes a conversion valve 200 installed at a hydraulic circuit which connects the EHPS unit 20, the auxiliary EHPS unit 100, and the hydraulic cylinder 5. The conversion valve 200 is controlled, at a position thereof, by the control of the controller, thereby selectively connecting the hydraulic line of the EHPS unit 100 with the hydraulic line of the auxiliary EHPS unit 20.

If only the EHPS unit 20 is operated, the conversion valve 200 blocks the hydraulic line of the auxiliary EHPS unit 100 but opens only the hydraulic line of the EHPS unit 20. Thereby, the hydraulic cylinder 5 may be supplied with only hydraulic pressure by the EHPS unit 20. The controller may be an ECU, and may be the same as the controller 11 of the MDPS unit 10 in the present exemplary embodiment.

Therefore, in the hybrid motor driven power steering system for a commercial vehicle of the present exemplary embodiment, the catch-up type steering system may be configured by a simple design change of further installing the auxiliary EHPS unit 100 similar to the EHPS unit 20. In addition, the steering capacity may be increased using the catch-up type steering system, and the catch-up type steering system may be easily utilized even in the full-sized commercial vehicle which needs the steering capacity of about 190 KN.

Figure 6:
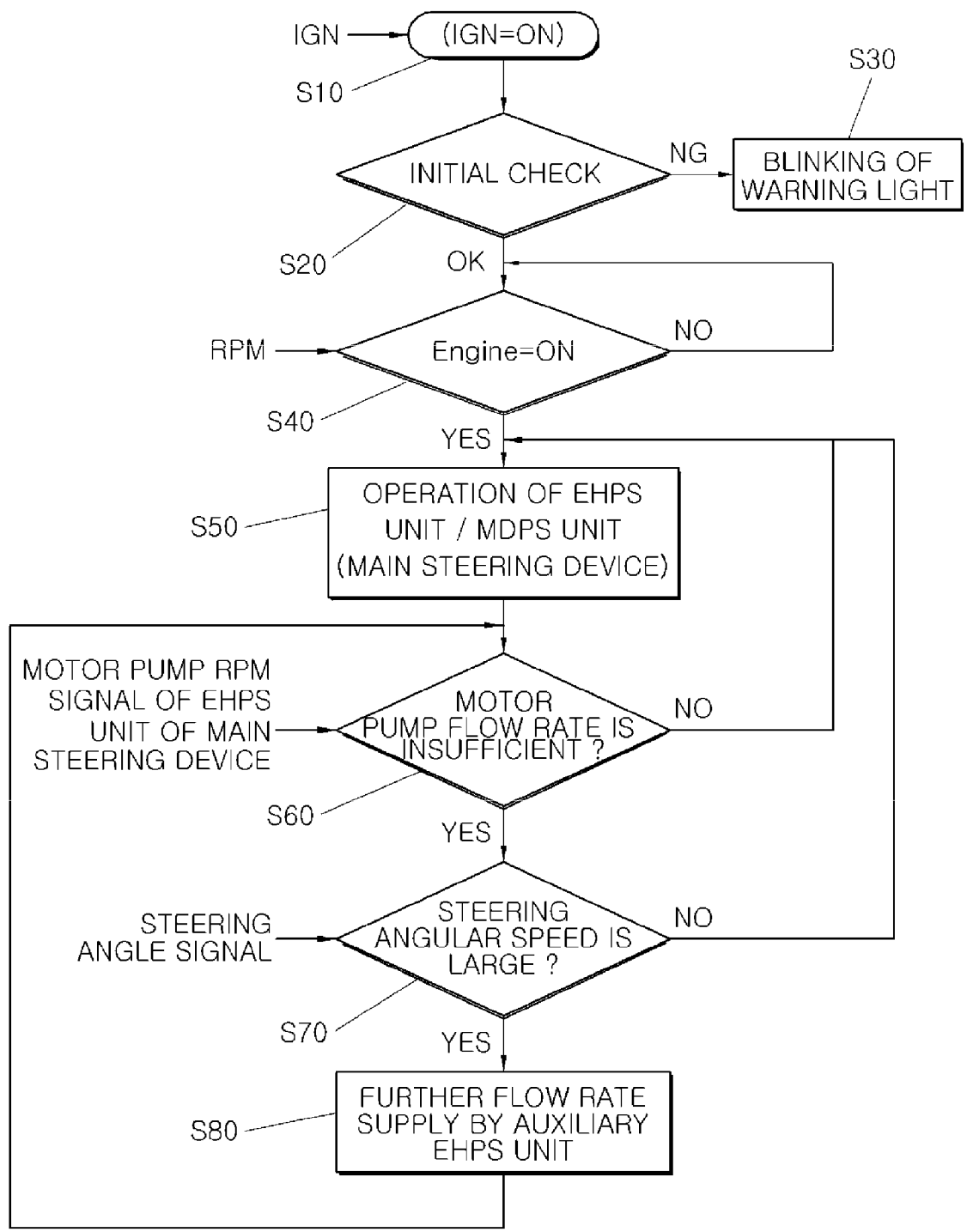
FIG. 6 is a flowchart illustrating catch-up performance improving logic of an exemplary hybrid motor driven power steering system for a commercial vehicle in accordance with the present invention.

FIG. 6 shows the catch-up performance improving logic of an exemplary hybrid motor driven power steering system for a commercial vehicle. At step S10, if an ignition key is turned ON (IGN=ON), a basic check is executed on check items.

Next, if it is determined that an error or a warning is required for any one of the check items at step S20, it proceeds to step S30 and a warning light is blinked. On the other hand, if all of the check items are normal at step S20, it proceeds to step S40 and it is checked to determine whether or not the ignition of the engine is ON. At this time, the ignition of the engine is repeatedly checked to determine whether or not it is ON, and this is determined by the rpm of the engine.

Next step is based on the check results of step S40. If it is determined that the ignition of the engine is ON, the logic to control the MDPS unit 10 and the EHPS unit 20 with a main steering device is executed at step S50. The execution logic at step S50 means the fuel efficiency improving logic including the hybrid MDPS control logic and/or the hybrid EHPS control logic which are described in the previous sections, and illustrated in FIGS. 3 and 4.

Meanwhile, step S60 is a process in which it is checked whether or not the steering capacity corresponding to the driver's steering is insufficient during the execution of the fuel efficiency improving logic at step S50, and is continuously or repeatedly performed. In this case, the insufficient status for the steering capacity is determined by the steering capacity of the EHPS unit 20, and more particularly, is checked by or determined based on the rpm of the pump 22 of the EHPS unit 20.

The capacity of the pump 22 is determined by an equation which is "maximum flow rate of the pump 22×0.9<flow rate required in the pump of the EHPS unit".

As the check results of step S50, if it is determined that the steering capacity of the EHPS unit 20 is insufficient, the desired target steering by a driver is checked again at step S70. Here, the desired target steering by a driver is a steering angular speed target value, and the steering angular speed target value is determined by the steering angular speed absolute value calculated from the detection value provided from torque sensor 14.

For example, the steering capacity of the EHPS unit 20 is insufficient if "steering angular speed target value>steering angular speed absolute value (about 450 degrees/s)" and is sufficient if "steering angular speed target value<steering angular speed absolute value (about 450 degrees/s)".

If it is determined that the steering capacity of the EHPS unit 20 is insufficient, the catch-up should be executed, whereas if it is determined that the steering capacity of the EHPS unit 20 is sufficient, the catch-up should not be executed.

Based on the check results of step S70, if it is determined that the steering capacity of the EHPS unit 20 is sufficient due to the small steering angular speed, it returns to step S50 and the fuel efficiency improving logic to control the MDPS unit 10 and the EHPS unit 20 with a main steering device is continuously or repeatedly executed.

Figure 7:
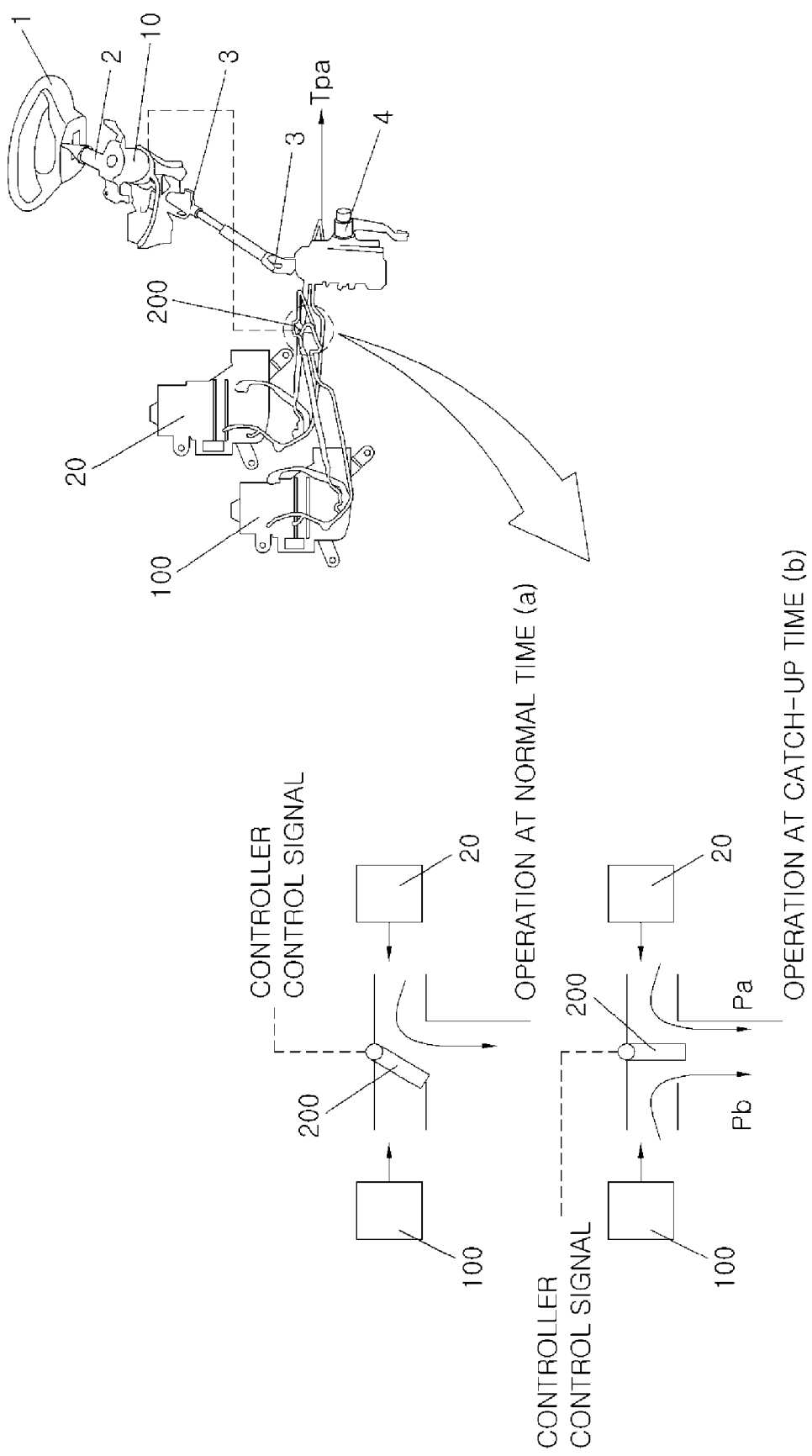
FIG. 7 is a diagram illustrating realization of catch-up performance of an exemplary hybrid motor driven power steering system for a commercial vehicle in accordance with the present invention.

The steering system according to such a control state is indicated as an operation at the normal time (a) in FIG. 7. Accordingly, as shown in FIG. 7, the conversion valve 200, installed at the connection passage leading to the hydraulic cylinder 5 by connecting the passage of the EHPS unit 20 and the passage of the auxiliary EHPS unit 100, is closed or not operated. Therefore, the output torque Tp generated at the gear box 4 is formed only by "motor steering torque Tm of the MDPS unit 10+hydraulic steering force of the EHPS unit 20".

On the other hand, based on the check results of step S70, if it is determined that the steering capacity of the EHPS unit 20 is insufficient due to the large steering angular speed, it proceeds to step S80 and the catch-up logic is executed.

The steering system according to such a control state is indicated as an operation at the catch-up time (b) in FIG. 7. Accordingly, as shown in FIG. 7, the conversion valve 200, installed at the connection passage leading to the hydraulic cylinder 5 by connecting the passage of the EHPS unit 20 and the passage of the auxiliary EHPS unit 100, is opened or operated.

The passage of the EHPS unit 20 and the passage of the auxiliary EHPS unit 100 are communicated with the connection passage leading to the hydraulic cylinder 5 due to the operation of the conversion 200. Thus, the hydraulic cylinder 5 is supplied with the hydraulic pressure provided from the EHPS unit 20 and the hydraulic pressure provided from the auxiliary EHPS unit 100 together.

Consequently, the pressure P applied to the hydraulic cylinder 5 is increased by the hydraulic pressure Pa provided from the EHPS unit 20 and the hydraulic pressure Pb provided from the auxiliary EHPS unit 100. Accordingly, the moving force applied to the cylinder rod is increased by "pressure (Pa+Pb)×area (A)".

Thus, the output torque Tpa generated at the ball nut type gear box 4 is formed by adding the motor steering torque Tm of the MDPS unit 10, the hydraulic steering force of the EHPS unit 20, and the hydraulic steering force of the auxiliary EHPS unit 100 (that is, "motor steering torque Tm of MDPS unit+hydraulic steering force of EHPS unit+hydraulic steering force of auxiliary EHPS unit). As such, when the steering capacity is further required, the catch-up performance may be immediately realized using the hydraulic pressure of the auxiliary EHPS unit 100.

As described above, the exemplary hybrid motor driven power steering system for a commercial vehicle includes the MDPS unit 10 to generate the motor output torque depending on the driver steering torque, the EHPS unit 20 to generate the hydraulic output torque considering the motor output torque of the MDPS unit 10, the ball nut type gear box 4 to generate the output torque Tp which operates the tie rod 8 leading to the left and right wheels 9a and 9b after being input with the driver steering torque, the motor output torque, and the hydraulic output torque, and the two torsion bars 31 and 32 to block the torque fluctuation rates at the respective regions of the joint 3 by detecting the road surface reaction force transferred to the steering column 2 through the ball nut type gear box 4 in at least two different positions. As a result, it may be possible to provide the steering capacity required in the medium-sized and full-sized commercial vehicles as well as the small-sized vehicle. In addition, it may be possible to prevent the torque fluctuation rates from being generated at the respective regions of the joint (universal joint) 3 connecting the MDPS mounting portion and the EHPS mounting portion by the two torsion bars 31 and 32. Furthermore, it may be possible to greatly enhance the catch-up performance using the auxiliary EHPS unit 100.

In accordance with various embodiments of the present invention, it may be possible to utilize a hybrid motor driven power steering system for a commercial vehicle capable of providing a steering capacity required in the medium-sized and full-sized commercial vehicles by constructing a MDPS unit and an EHPS unit controlled by a main steering control device, thereby capable of greatly increasing fuel efficiency even in the medium-sized and full-sized commercial vehicles as well as a small-sized vehicle.

Also, in accordance with various embodiments of the present invention, it may be possible to provide a hybrid motor driven power steering system for a commercial vehicle capable of enhancing improvement in fuel efficiency even in medium-sized and full-sized commercial vehicles as well as a small-sized vehicle, and capable of being easily applied also to, particularly, a high weight passenger vehicle, such as a bulletproof vehicle, which needs a high steering capacity, by constructing a ball nut type gear box together with a MDPS unit and an EHPS unit controlled by a main steering control device.

In addition, in accordance with various embodiments of the present invention, it may be possible to provide a hybrid motor driven power steering system for a commercial vehicle capable of enhancing improvement in fuel efficiency by constructing a MDPS unit and an EHPS unit controlled by a main steering control device and installing two torsion bars, and capable of preventing a torque fluctuation rate from being generated at a joint (universal joint) region of a steering column to connect a MDPS mounting portion and an EHPS mounting portion, thereby realizing steering control in which a road surface reaction force is exactly reflected.

Furthermore, in accordance with various embodiments of the present invention, it may be possible to provide a hybrid motor driven power steering system for a commercial vehicle capable of enhancing performance thereof and improvement in fuel efficiency, by realizing steering control in which a road surface reaction force is exactly reflected at a joint (universal joint) region of a steering column using two torsion bars without generation of a torque fluctuation rate.

Furthermore, in accordance with various embodiments of the present invention, it may be possible to realize robust control against reversal input such as pull, shimmy, and judder during high speed driving and further improve steering control performance by enhancement of on-center feel and stability during low speed driving, by greatly increasing improvement in fuel efficiency and performance of a hybrid motor driven power steering system for a commercial vehicle.

Furthermore, in accordance with various embodiments of the present invention, it may be possible to dually construct a MDPS unit and an EHPS unit controlled by a main steering control device and to further add an auxiliary EHPS unit, thereby corresponding also to the requirement of, particularly, a full-sized commercial vehicle and greatly increasing catch-up performance using the auxiliary EHPS unit.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hybrid motor driven power steering system for a commercial vehicle comprising:
   a Motor Driven Power Steering (MDPS) unit configured to generate motor output torque corresponding to a portion of detected driver torque, wherein the MDPS unit is mounted to a steering column connecting a steering wheel;
   an Electro-Hydraulic Power Steering (EHPS) unit configured to generate hydraulic output torque, to create, together with the motor output torque of the MDPS unit, an output required for steering the commercial vehicle;
   a ball nut type gear box configured to include a hydraulic cylinder having a large hydraulic area and a ball nut to generate real output torque of a piston using hydraulic pressure supplied from the EHPS unit;

a link configured to be operated by the output torque generated at the ball nut type gear box to operate a tie rod connected to left and right wheels; and two torsion bars configured to be respectively installed in at least two different positions of the steering column to detect a road surface reaction force which is introduced to the ball nut type gear box and transferred to the steering wheel.

2. The hybrid motor driven power steering system for a commercial vehicle of claim 1, wherein the MDPS unit comprises a motor controlled by a controller to generate the motor output torque, a decelerator which decreases a rotational force of the motor and increases torque of the motor, and a torque sensor which detects steering angle information of the steering wheel by the driver torque and transfers the detected steering angle information to the controller.

3. The hybrid motor driven power steering system for a commercial vehicle of claim 1, wherein the EHPS unit comprises a pump controlled by a controller to generate the hydraulic output torque, and an oil reservoir which stores oil to provide hydraulic pressure sent to the hydraulic cylinder from the pump.

4. The hybrid motor driven power steering system for a commercial vehicle of claim 1, wherein the link comprises a pitman arm which is connected to the ball nut of the ball nut type gear box and converts a rotation of the ball nut to an angular motion, a drag link which is connected to the pitman arm and is pulled or pushed, and a spindle arm to transfer movement of the drag link to any one of the left and right wheels.

5. The hybrid motor driven power steering system for a commercial vehicle of claim 1, wherein one of the two torsion bars is used as an EHPS torsion bar which is installed at one portion of the steering column mounting the EHPS unit, whereas the other is used as a MDPS torsion bar which is installed at the other portion of the steering column mounting the MDPS unit.

6. The hybrid motor driven power steering system for a commercial vehicle of claim 1, wherein the EHPS unit is connected to a hydraulic line to supply the hydraulic cylinder with a hydraulic pressure, the hydraulic line is formed with another hydraulic line branched at a position before the hydraulic cylinder, a conversion valve is installed between the hydraulic line and the branched hydraulic line, and an auxiliary EHPS unit is installed at the branched hydraulic line.

7. The hybrid motor driven power steering system for a commercial vehicle of claim 1, wherein the MDPS unit and the EHPS unit collectively have a steering capacity of 50 KN to 100 KN, and are adapted for small-sized and medium-sized commercial vehicles.

8. A hybrid motor driven power steering system for a commercial vehicle comprising:

a MDPS unit configured to generate motor output torque corresponding to a portion of detected driver torque, wherein the MDPS unit is mounted to a steering column connecting a steering wheel;

an EHPS unit configured to generate hydraulic output torque, to create, together with the motor output torque of the MDPS unit, an output required for steering the commercial vehicle, wherein the EHPS unit is connected to a hydraulic line to supply a hydraulic pressure to a hydraulic cylinder;

an auxiliary EHPS unit installed at a branched hydraulic line, wherein the branched hydraulic line is split from the hydraulic line at a position before the hydraulic cylinder, a conversion valve is installed between the hydraulic line and the branched hydraulic line, and the auxiliary EHPS unit supplies another hydraulic pressure to the hydraulic cylinder through the branched hydraulic line when the conversion valve is open;

a ball nut type gear box configured to include the hydraulic cylinder having a large hydraulic area and a ball nut to generate real output torque of a piston using hydraulic pressures supplied by the EHPS unit and the auxiliary EHPS unit;

a link configured to be operated by the output torque generated at the ball nut type gear box to operate a tie rod connected to left and right wheels; and two torsion bars configured to be respectively installed in at least two different positions of the steering column to detect a road surface reaction force which is introduced to the ball nut type gear box and transferred to the steering wheel.

9. The hybrid motor driven power steering system for a commercial vehicle of claim 8, wherein the auxiliary EHPS unit operates when the hydraulic output torque provided by the EHPS unit is insufficient.

10. The hybrid motor driven power steering system for a commercial vehicle of claim 9, wherein the auxiliary EHPS unit operates when the hybrid motor driven power steering system satisfies a relation of "maximum flow rate of pump of the EHPS unit×0.9<flow rate required in pump of the EHPS unit" and a relation of "drive steering torque>steering angular speed absolute value".

11. The hybrid motor driven power steering system for a commercial vehicle of claim 10, wherein the steering angular speed absolute value is about 450 degrees/s.

12. The hybrid motor driven power steering system for a commercial vehicle of claim 8, wherein the MDPS unit, the EHPS unit, and the auxiliary EHPS unit collectively have a steering capacity of 100 KN to 190 KN, and are adapted for steering a full-sized vehicle.

13. A method of improving performance and fuel efficiency through control of a hybrid motor driven power steering system for a commercial vehicle comprising:

providing information which includes a steering angle signal, a steering torque signal, a vehicle speed, or a yaw rate of the vehicle;

computing a motor output torque value, which is a portion of a driver torque, for a MDPS unit;

computing a hydraulic output torque value, which is the remaining portion of the driver torque, for a EHPS unit;

performing a reversal input robust control manner which, depending on the vehicle speed, secures reversal input robust by steering the EHPS unit near wheels during a high speed driving with difficulty, and secures basic steering power by steering the MDPS unit near a driver with ease;

performing a steering performance enhancing control manner which, depending on the vehicle speed, enhances vehicle reactivity with respect to a steering operation by steering the EHPS unit with ease during a low speed driving; and generating the motor output torque of the MDPS unit and the hydraulic output torque of the EHPS unit after the reversal input robust control manner and the steering performance enhancing control manner are performed, and providing the motor output torque and the hydraulic output torque as an output torque of a ball nut type gear box so that the motor output torque and the hydraulic output torque operate a link connected to a tie rod to operate left and right wheels.

14. The method of improving performance and fuel efficiency through control of a hybrid motor driven power steering system for a commercial vehicle of claim 13, wherein when the reversal input robust control manner is performed, the MDPS unit is realized by "[MDPS tuning map×M (control amount)×[torque change×vehicle speed×yaw rate change]/(steering angle change)]+K (control ratio distribution amount)", the EHPS unit is realized by "[MDPS tuning map×M (control amount)×(steering angle change)/[torque change×vehicle speed×yaw rate change]]+L (control ratio distribution amount)", and the K (control ratio distribution amount) and the L (control ratio distribution amount) are respectively proportional to a detection value of a MDPS torsion bar of the MDPS unit according to the driver torque and a detection value of an EHPS torsion bar of the EHPS unit according to the driver torque.

15. The method of improving performance and fuel efficiency through control of a hybrid motor driven power steering system for a commercial vehicle of claim 13, wherein when the steering performance enhancing control manner is performed, the MDPS unit is realized by "[MDPS tuning map×N (control amount)×(vehicle speed/steering angle)]+K (control ratio distribution amount)" to steer a steering wheel with difficulty during the low speed driving, and is realized by "[MDPS performance enhancing map×N (control amount)×(vehicle speed/steering angle)]" to increase a torque control amount for enhancing the performance during the low speed driving, whereas the EHPS unit is realized by "[EHPS tuning map×N (control amount)×(vehicle speed/steering angle)]+L (control ratio distribution amount)" to steer the steering wheel with ease during the high speed driving.

16. The method of improving performance and fuel efficiency through control of a hybrid motor driven power steering system for a commercial vehicle of claim 13, further comprising:

executing a catch-up performance enhancing logic, when a fuel efficiency improving logic is performed, to further generate separate hydraulic output torque from the EHPS unit by continuously checking the hydraulic output torque provided from the EHPS unit and operating a separate auxiliary EHPS unit when the hydraulic output torque provided from the EHPS unit is insufficient.

17. The method of improving performance and fuel efficiency through control of a hybrid motor driven power steering system for a commercial vehicle of claim 16, wherein the executing the catch-up performance enhancing logic comprises:

preparing the catch-up performance enhancing logic in which it is determined that ignition of an engine is ON by a revolution speed of the engine, without generation of error or warning items needing blinking of a warning light when a ignition key is turned ON, and after the fuel efficiency improving logic is performed, a pump capacity of the EHPS unit is continuously checked; and performing the catch-up performance enhancing logic in which when it is determined that the pump capacity of the EHPS unit is insufficient, a current steering angular speed value detected by the driver torque is larger than a set steering angular speed absolute value, and the current steering angular speed value is large, the auxiliary EHPS unit is operated.

18. The method of improving performance and fuel efficiency through control of a hybrid motor driven power steering system for a commercial vehicle of claim 17, wherein in the performing the catch-up performance enhancing logic, the insufficient status of the pump capacity of the EHPS unit is determined by "maximum flow rate of pump of the EHPS unit×0.9<flow rate required in pump of the EHPS unit", and the steering angular speed absolute value is about 450 degrees/s.

* * * * *